US005762974A

United States Patent [19]

Bisio et al.

[11] Patent Number: 5,762,974

[45] Date of Patent: Jun. 9, 1998

[54] DIE PLATE FOR PRESS-MOLDING OF REFRACTORY BRICKS

[75] Inventors: Giovanni Bisio; Fabrizio Bisio; Roberto Bisio, all of Turin, Italy

[73] Assignee: TCA International S.r.l., Turin, Italy

[21] Appl. No.: 767,383

[22] Filed: Dec. 16, 1996

[30] Foreign Application Priority Data

Dec. 20, 1995 [IT] Italy .................................. TO95A1030

[51] Int. Cl.[6] .................................................. B29C 43/36

[52] U.S. Cl. .......................... 425/186; 249/112; 249/116; 264/338; 425/195; 425/352; 425/394; 425/403; 425/470; 425/DIG. 30

[58] Field of Search .................................... 425/183, 186, 425/192 R, 195, 193, 394, DIG. 30, 403, 470, 352; 264/319, 299, 338; 249/114.1, 116, 112, 115

[56] References Cited

U.S. PATENT DOCUMENTS

| | | | |
|---|---|---|---|
| 2,274,060 | 2/1942 | Hart | 425/DIG. 30 |
| 3,363,875 | 1/1968 | Hedgewick et al. | 425/DIG. 30 |
| 3,417,959 | 12/1968 | Schultz | 425/DIG. 30 |
| 5,261,804 | 11/1993 | Jachowsky | 425/192 R |

*Primary Examiner*—Jay H. Woo
*Assistant Examiner*—Joseph Leyson
*Attorney, Agent, or Firm*—Sughrue, Mion, Zinn, Macpeak & Seas, PLLC

[57] ABSTRACT

A plate for press-moulding dies of refractory bricks and the like, including a bearing metal slab to one face of which a lining of high wear-resistant material, normally hard metal, is applied, which is formed by a number of adjacent tiles arranged in an orderly way along parallel lines. The adjoining sides between adjacent tiles are at least in part curved.

7 Claims, 2 Drawing Sheets

DIE PLATE FOR PRESS-MOLDING OF REFRACTORY BRICKS

BACKGROUND OF THE INVENTION

The present invention is related to the plates intended to constitute dies for the press-moulding of refractory bricks and the like.

Traditionally, these plates comprise a bearing metal slab on one face of which a lining, made of a high wear-resistant material, is applied. Such a material, the wear resistance of which is in any case greater than that of high chromium content steel, may normally consist of hard metal (tungsten carbide), or even of ceramics.

In the past, the lining of high wear-resistant material was constituted by a single one-piece element applied in correspondence of a recessed area of the metal bearing slab. This solution involved serious drawbacks due to the fact that, in case of localized wearing or breakage, in order to restore the plate the entire high wear-resistant lining had to be replaced, with consequent huge costs.

In more recent times, i.e. around the mid '60s, the applicant had proposed a construction wherein the high wear-resistant material lining was composed of a number of rectangular strips, with the longer sides thereof arranged slightly obliquely, secured by glueing directly to the bearing slab or to respective intermediate metal cleats, in turn mechanically fixed to the bearing slab. This solution gave only a partial solution to the drawbacks of the prior plates provided with a one-piece lining, since localized wearing or any breakages required removal and replacement of high wear-resistant material elements having anyhow a wide surface. Moreover the elasticity of the strips was poor, whereby breakage thereof occurred relatively frequently, and resistance to glueing was limited.

In still more recent times, i.e. at the beginning of the '80s, the applicant proposed a further improvement consisting of forming the high wear-resistant material lining with a plurality of adjacent tiles, arranged in an orderly way along parallel lines and with the sides of each tile adjoining the sides of the adjacent tiles. These tiles had a quadrangular design, namely had a parallelogram or rhomboidal shape.

This arrangement enabled to achieve appreciable advantages in terms of longer operation life deriving from a higher elasticity of the high wear-resistant material lining as a whole, as well as in terms of a more convenient restoration of the plate in case of breakage of one or more tiles.

However this construction involves, although following a relative long operation time of the plate, an inconvenience due to the fact that the contacting oblique sides of adjacent tiles, which are necessarily offset across the successive lines, give rise to flow paths of the pressed material which originate channels of deeper wear oriented parallel to the vertical sides of the plates. Consequently, in the boundary of the adjoining oblique sides between the various tiles, wear is more remarkable than in the central areas of the tiles themselves. These deeper wear vertical channels may, in the time, originate crackings in correspondence of the adjoining tile borders.

SUMMARY OF THE INVENTION

The object of the present invention is to overcome the above drawback, and to provide a press-moulding die plate of the above-referenced type which is further improved and, in particular, is designed so as to substantially prevent, in use, the formation of wear channels and crackings in correspondence of the contacting sides between adjacent high wear-resistant material tiles.

According to the invention, this object is primarily achieved by virtue of the fact that the adjoining sides of the tiles are at least in part curved.

The curved sides are normally in part concave and in part convex, and in any case these sides are those oriented transversely to the tile lines arranged parallel to the lower and upper sides of the plate.

The invention contemplates two possible alternative embodiments, in the first of which along each line said curved side of the tiles are alternatively both concave and, respectively, both convex.

According to the second embodiment, along each line said curved sides of the tiles are one concave and the other convex.

A number of lines of tiles may be secured, normally by brazing or by glueing, to an intermediate support strip which in turn is fixed to the bearing slab of the plate. In alternative, the tiles may be secured, also by brazing or glueing, directly to the metal bearing slab of the plate.

BRIEF DESCRIPTION OF THE DRAWINGS

The invention will now be disclosed in detail with reference to the accompanying drawings, purely provided by way of non-limiting example, in which.

DETAILED DESCRIPTION OF THE INVENTION

Figure 1:
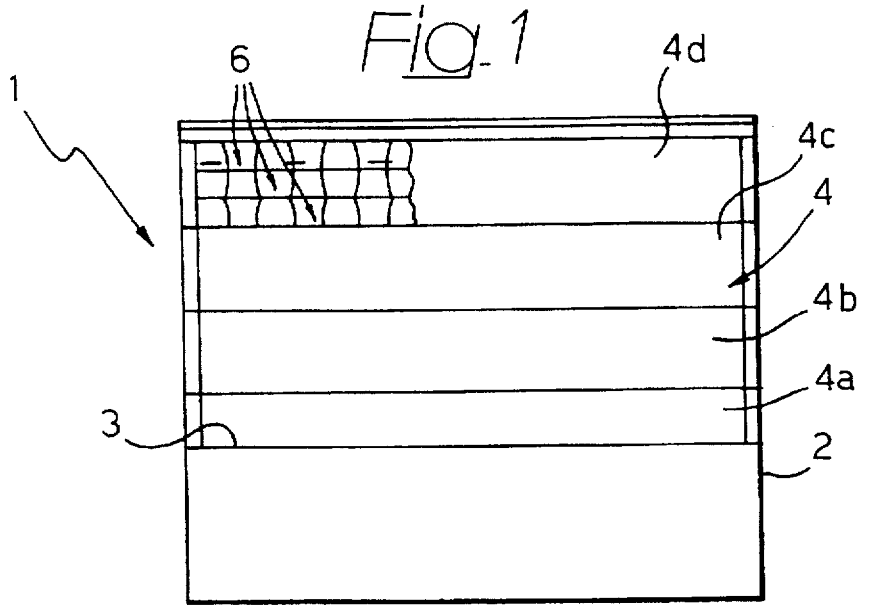
FIG. 1 is a diagrammatic front elevational view of a press-moulding die plate according to the invention.
Figure 2:
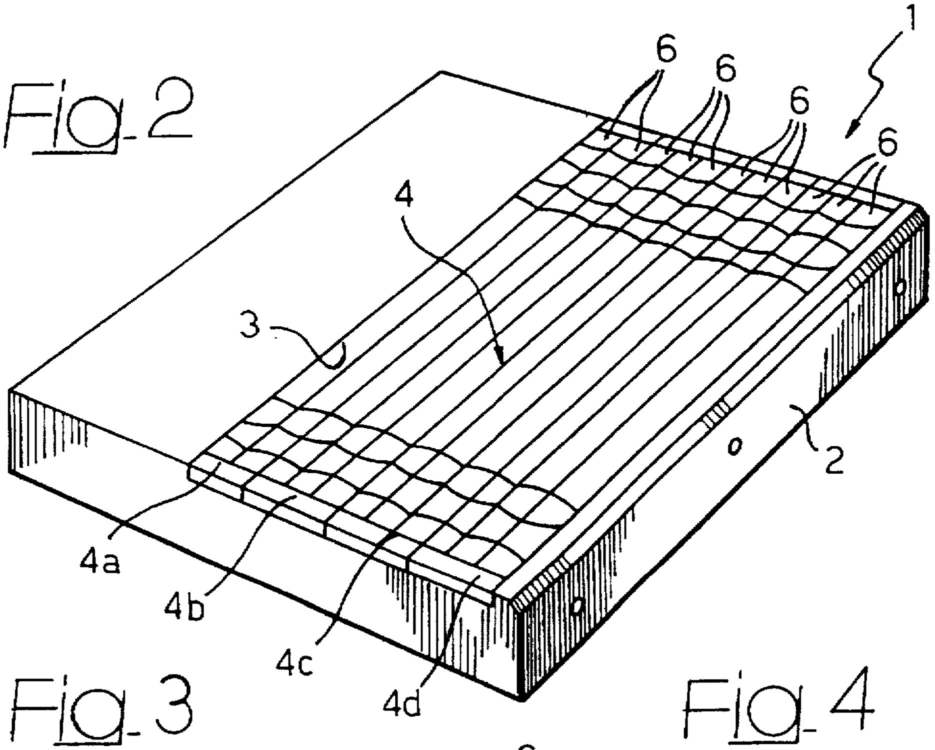
FIG. 2 is a perspective and enlarged view of the plate.

Referring initially to FIGS. 1 through 9, reference numeral 1 generally designates a plate intended to constitute one of the lateral walls of a die for press-moulding of refractory bricks.

The plate 1 is formed by a bearing slab 2, normally made of steel, having a recessed area 3 in which a lining, generally designated as 4 and made of a high wear-resistant material, is applied.

The lining 4 is constituted, in the shown example, by a series of superimposed horizontal elements **4*a*, 4*b*, 4*c*, 4*d* each of which is formed by a support strip 5 secured to the slab 2 by screwing or glueing, and carrying horizontal lines 6** of adjacent tiles made of a material having a resistance to wear superior to that of a high chromium content steel. Such a material is normally hard metal (tungsten carbide), but may also be a ceramic material.

Figure 3:
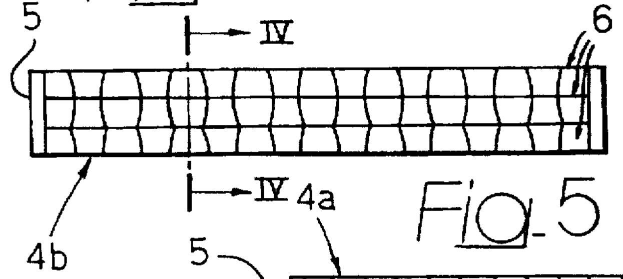
FIG. 3 is an elevational view of a detail of the plate.
Figure 4:
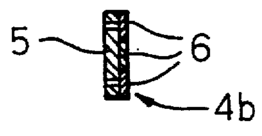
FIG. 4 is a cross-sectioned view along line IV—IV of FIG. 3.
Figure 5:
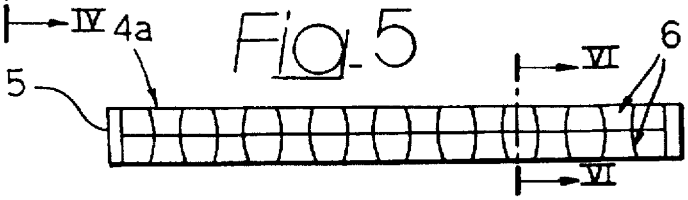
FIG. 5 is an elevational view of another detail of the plate.
Figure 6:
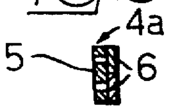
FIG. 6 is a cross-sectioned view along line VI—VI of FIG. 5.

FIGS. 3 and 4 show in detail the element 4b, which is identical to elements 4c and 4d. This element 4b carries three tile lines 6, which are normally fixed to the support strip 5 by brazing. Only by way of example, element 4b may be 377 mm long, 59 mm high and globally 14 mm thick. The lower element 4a is instead provided with only two tile lines 6, and has consequently a reduced height, for instance of about 39 mm.

Figure 7:
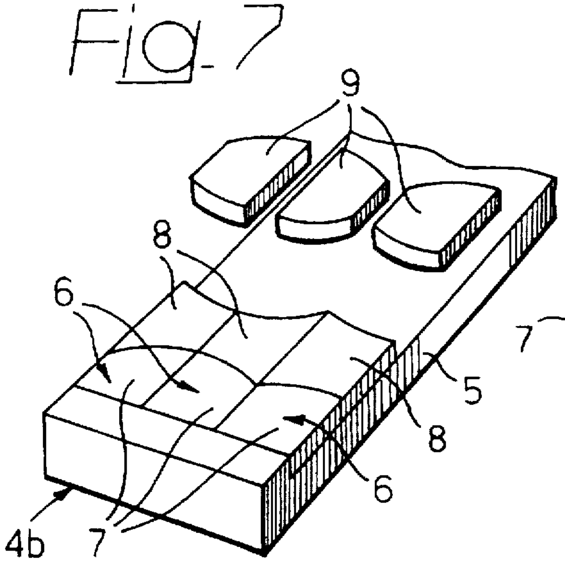
FIG. 7 is a fragmentary, partially exploded and enlarged perspective view of the detail shown in FIG. 3.
Figure 8:
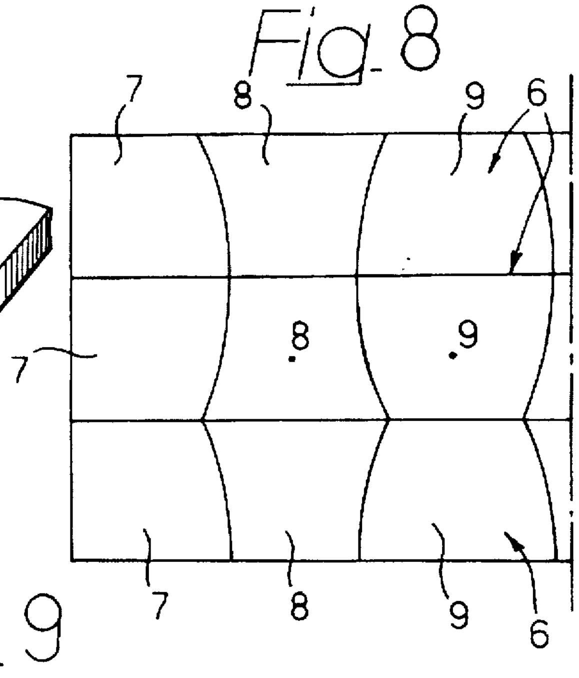
FIG. 8 shows a part of FIG. 3 in an enlarged scale.

FIGS. 7 and 8 show in detail the composition of the lines 6 of the tiles made of a high wear-resistant material, with particular reference to the element 4b, the arrangement being identical as far as elements 4c and 4d are concerned, while that of the lower element 4a is different only in connection to what has been clarified in the above.

The tiles employed for the lines 6 are all provided with the fundamental feature of the invention according to which, along each line 6, the contacting sides between each tile and the adjacent tile, or tiles, are curved. In other words, since the tile lines 6 are oriented parallel to the lower and upper sides of the plate 1, said curved sides are those generally oriented transversely to the longitudinal direction of the lines 6.

Figure 9:
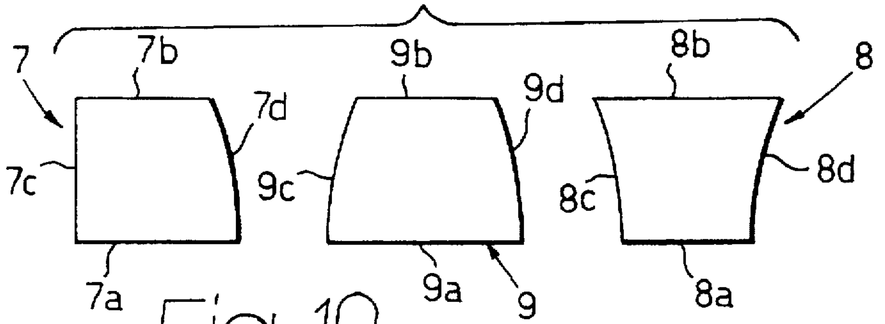
FIG. 9 shows in detail the geometrical configuration of the tiles employed in the plate according to FIGS. 1 through 8.

In detail, and specifically referring to FIGS. 7 through 9, each line 6 comprises a pair of end tiles 7 and a plurality of intermediate alternate tiles 8, 9.

Each end tile 7 has three straight sides, respectively a lower side 7a, an upper side 7b and an outer side 7c, while the fourth side 7d is convex.

Each tile 8 has a lower straight side 8a and an upper straight side 8b, and the other two opposed sides 8c, 8d are concave.

Each tile 9 has a lower straight side 9a and an upper straight side 9b, and the other two opposed sides 9c, 9d are convex.

Consequently, in each line 6 the inner convex side 7d of one of the end tiles 7 is adjoining the concave side 8c of the adjacent tile 8, whose concave side 8d is adjoining the convex side 9c of the adjacent tile 9, whose opposite convex side 9d is adjoining the concave side 8c of the subsequent tile 8, and so on as far as the other end tile 7.

The arrangement is specularly opposed for each pair of adjacent lines 6, in the sense that the tile sides 7a, 8a, 9a are alternatively located upwardly and downwardly.

According to the above-disclosed arrangement, the transition areas between the tiles 7, 8, 9 in the transverse direction with respect to the upper and lower sides of the plate 1 have, along the whole surface of the lining 4, a curvilinear configuration. This configuration enables, when using the plate 1, to prevent or at least appreciably reduce the generation of deeper wear vertical channels along the adjoining edges of the tiles and, consequently, the risk of crackings along these areas.

After all, the curved design of the contacting sides between the high wear-resistant material tiles leads to a remarkable increase of the operative life of the plate 1 according to the invention.

Purely by way of non limiting example, the above disclosed tiles may be provided with the following dimensional values:

tile 7:

length of side 7a=22 mm; length of side 7b=20 mm; length of side 7c=18 mm; curvature radius of side 7d=52 mm tile 8:

length of side 8a=18 mm; length of side 8b=26 mm; distance between sides 8a–8b=20 mm; curvature radius of sides 8c, 8d=52 mm tile 9:

length of side 9a=27 mm; length of side 9b=19 mm; distance between sides 9a–9b=20 mm; curvature radius of sides 9c, 9d=52 mm.

The thickness of each tile 7, 8, 9 may be comprised between 3 and 12 mm, and more preferably between 5 and 7 mm.

Figure 10:
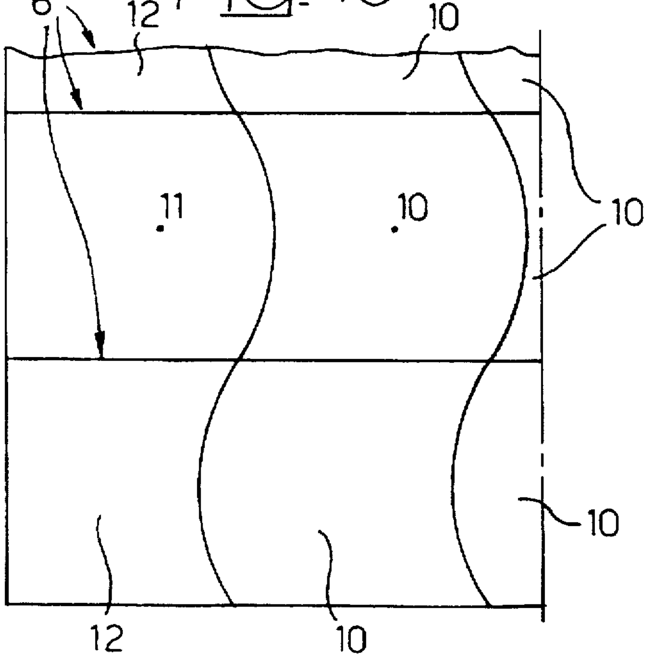
FIG. 10 shows a variant of FIG. 8.
Figure 11:
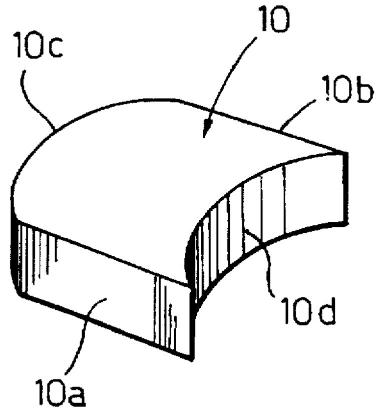
FIG. 11 is a perspective view of one of the tiles employed in the variant of FIG. 10.

The advantages explained in the above can be achieved even with geometrical designs of the high wear-resistant material tiles different from those previously disclosed. A possible variant is shown in FIGS. 10 and 11: in this embodiment, each horizontal line 6 is formed by tiles 10 whose upper and lower sides 10a, 10b are straight and whose lateral sides, i.e. sides 10c, 10d contacting the adjacent tiles 10, are one convex and the other concave. In this case the end tiles, referenced as 11 and 12, are provided with three straight sides and one convex or concave inner side, as depicted in FIG. 10.

Also in this case the arrangement for each line 6 will be specularly symmetrical with respect to the adjacent lines 6, whereby in practice the adjoining edge areas in the transverse direction, with respect to the upper and lower sides of the plate 1 will have a sinusoidal configuration as depicted in FIG. 10.

Purely by way of non limiting example, the dimensional values of each tile 10 may substantially be as follows:

length of straight sides 10a, 10b=20 mm; distance between the straight sides 10a–10b=20 mm; curvature radius of the convex and concave sides 10c, 10d=18.17 mm.

Also in this case the tile thickness may be comprised between 3 and 12 mm.

Naturally the details of construction and the embodiments can be widely varied with respect to what has been disclosed and illustrated, without thereby departing from the scope of the present invention such as defined in the appended claims.

Thus, for instance, in both the above-disclosed embodiments the tiles 7, 8, 9 and 10, 11, 12, respectively, may be secured by brazing (or even by glueing) directly to the metal slab 2, without the interposition of the intermediate strips 5. However the previously described arrangement, employing the intermediate strips 5, is to be preferred in connection with a more convenient restoration of the lining 4 following wear or any localized breakage. Moreover, also the tile sides arranged parallel to the upper and lower edges of the plate 1 might be curved instead of straight, as in the case of the illustrated examples. Lastly, the tiles may be arranged according to oblique configurations or any other arrangement, rather than along lines and columns perpendicular to one another.

What is claimed is:

1. A mold press plate for press-moulding dies of refractory bricks comprising a vertically disposed bearing metal slab having upper and lower sides, a flat face between said sides and a lining of a wear-resistant material applied to said flat face of said metal slab, wherein said lining is formed by a plurality of adjacent tiles each having four sides and arranged in a plurality of parallel lines which extend parallel to said upper and lower sides and wherein adjacent side surfaces of said tiles in each line are disposed in contact with each other and are complementary curved side surfaces disposed transversely of said line.

2. A plate as set forth in claim 1, wherein each line of tiles has two end tiles and a plurality of intermediate tiles with each end tile having only one said curved side surface complementary to the curved side surface of an adjacent one of said intermediate tiles.

3. A plate as set forth in claim 2, wherein said intermediate tiles are comprised of first tiles having two concave side surfaces and second tiles having two convex side surfaces with said first and second tiles disposed in alternating arrangement.

4. A plate as set forth in claim 4, wherein each of said intermediate tiles has a concave side surface and a convex side surface.

5. A plate as set forth in claim 1, further comprising intermediate support strips fixed to said bearing metal slab with said lines of tiles being secured by brazing to said intermediate support strips.

6. A plate as set forth in claim 5, wherein a number of said lines of tiles on each intermediate support strip is two or three.

7. A plate according to claim 1, wherein said tiles are secured by brazing directly to said bearing metal slab.

* * * * *